United States Patent
Deleris (12)

(10) Patent No.: US 7,984,336 B2
(45) Date of Patent: Jul. 19, 2011

(54) METHOD AND SYSTEM FOR STORING DATA FROM A PLURALITY OF PROCESSORS

(75) Inventor: Bertrand Deleris, Seysses (FR)

(73) Assignee: Freescale Semiconductor, Inc., Austin, TX (US)

( * ) Notice: Subject to any disclaimer, the term of this patent is extended or adjusted under 35 U.S.C. 154(b) by 248 days.

(21) Appl. No.: 12/300,447

(22) PCT Filed: May 24, 2006

(86) PCT No.: PCT/IB2006/052664
§ 371 (c)(1),
(2), (4) Date: Nov. 11, 2008

(87) PCT Pub. No.: WO2007/135490
PCT Pub. Date: Nov. 29, 2007

(65) Prior Publication Data
US 2009/0249127 A1    Oct. 1, 2009

(51) Int. Cl.
*G06F 11/00* (2006.01)
(52) U.S. Cl. .............................. 714/45; 714/31; 710/105
(58) Field of Classification Search .................... 714/25, 714/27, 30, 31, 45; 710/61, 105, 106; 713/375
See application file for complete search history.

(56) References Cited

U.S. PATENT DOCUMENTS

| | | | |
|---|---|---|---|
| 5,191,653 A | 3/1993 | Banks et al. | |
| 5,884,066 A | 3/1999 | Kuijsten | |
| 5,909,559 A * | 6/1999 | So ................................ 710/307 |
| 6,021,261 A | 2/2000 | Barrett, Jr. et al. | |
| 6,539,500 B1 | 3/2003 | Kahle et al. | |
| 2005/0034017 A1* | 2/2005 | Airaud et al. .................... 714/25 |
| 2006/0184837 A1* | 8/2006 | Al-Omari ........................ 714/45 |
| 2008/0250275 A1* | 10/2008 | Walker et al. ................... 714/45 |
| 2010/0229042 A1* | 9/2010 | Goyal et al. .................... 714/31 |

OTHER PUBLICATIONS

Debug Support, Calibration and Emulation for Multiple Processor and Powertrain Control SoCs. Mayerl, H. Siebert1, K.D. McDonald-Maier2. 1Infineon Technologies AG, Automotive & Industrial, Munich, Germany. 2University of Kent, Department of Electronics, Canterbury, CT2 7NT, UK., Date 05.

Multithreaded architectural support for speculative trace scheduling in VLIW processors, Agarwal, M.; Nandy, S.K.; v Eijndhoven, J.; Balakrishanan, S.,Integrated Circuits and Systems Design, 2002. Proceedings. 15th Symposium on Sep. 9-14, 2002.

Tracing application execution: tracing without hindering performance, Abramson, T., C/C++ Users Journal vol. 22, No. 6 Jun. 2002.

An efficient and flexible tracing technique, Lemon, D, C/C++ Users Journal vol. 20, No. 4 Apr. 2002.

* cited by examiner

*Primary Examiner* — Robert Beausoliel
*Assistant Examiner* — Joseph D Manoskey

(57) ABSTRACT

A method of storing data from a plurality of processors comprising the steps of (a) transferring data along a first bus (b) connectable between a first processor and a synchronizing means and operable with a first protocol; (c) synchronizing the synchronizing means with a second processor; and (d) transferring the data along a second bus to a memory of the second processor wherein the second bus is connectable between the synchronizing means and the memory of a second processor and operable with a second protocol.

20 Claims, 2 Drawing Sheets

METHOD AND SYSTEM FOR STORING DATA FROM A PLURALITY OF PROCESSORS

FIELD OF THE INVENTION

The present invention relates to a method and system for storing data from a plurality of processors. In particular, the present invention relates to a method and system for storing trace data from a plurality of sensors provided in a same integrated circuit.

BACKGROUND OF THE INVENTION

System-on-a-chip (SoC) technology is the packaging of all the electronic circuits and parts of a system, such as a cell phone or digital camera, on a single integrated circuit (IC). At present, a typical wireless baseband SoC comprises one or more microcontrollers, microprocessors or DSP core(s). The growing complexity of these systems has rendered the process of debugging increasingly difficult.

There are a number of well-known embedded systems debugging tools including:
(a) the Joint Test Action Group (JTAG) (IEEE 1149.1 specification);
(b) background debug mode (BDM);
(c) on-chip emulation (OnCE);
(d) break points and watch points.

However, these traditional debugging tools are proving inadequate to cope with the growing complexity of multi-core SoC systems. More recently, hardware tracing has been considered as a means of overcoming this problem.

Klaus McDonald-Maier & Andrew Hopkins, University of Kent, (http://esemagazine.co.uk/common/viewer/archive/2004/Sep/28/feature6.phtm) highlights the need for multi-core debuggers, but concentrates on the debugging tools aspect rather than the architecture of such systems.

Abramson, T., C/C++ Users Journal 22 (6), June 2004 and Lemon, D, C/C++ Users Journal 20(4), April 2002 describe techniques for trace buffer manipulation. However, these techniques are mainly software based and targeted at single core architectures. Similarly, Balakrishanan S. et al.; Integrated Circuits and Systems Design, 2002. Proceedings, 15th Symposium 9-14 Sep. 2002 relates to single core tracing for a hyper-threaded processor.

Debug Support, Calibration and Emulation for Multiple Processor and Powertrain Control SoCs. Mayer, H. Siebert, K. D. McDonald-Maier. Infineon Technologies AG, Automotive & Industrial, Munich, Germany. University of Kent, Department of Electronics, Canterbury, CT2 7NT, UK, describes the inclusion of an additional package connected on an SoC. However, since additional hardware is required to implement this approach, it is likely to increase the die size of an SoC.

SUMMARY OF THE INVENTION

The present invention provides a method and system for storing data from a plurality of processors as described in the accompanying claims.

BRIEF DESCRIPTION OF THE DRAWINGS

An embodiment of the invention will now be described by way of example only with reference to the accompanying Figures in which.

DETAILED DESCRIPTION OF THE PREFERRED EMBODIMENTS

A hardware trace comprises a history of the instructions executed by a microprocessor. It may also include context-switches between various tasks and addresses and values written to, or read from, memory.

Figure 1:
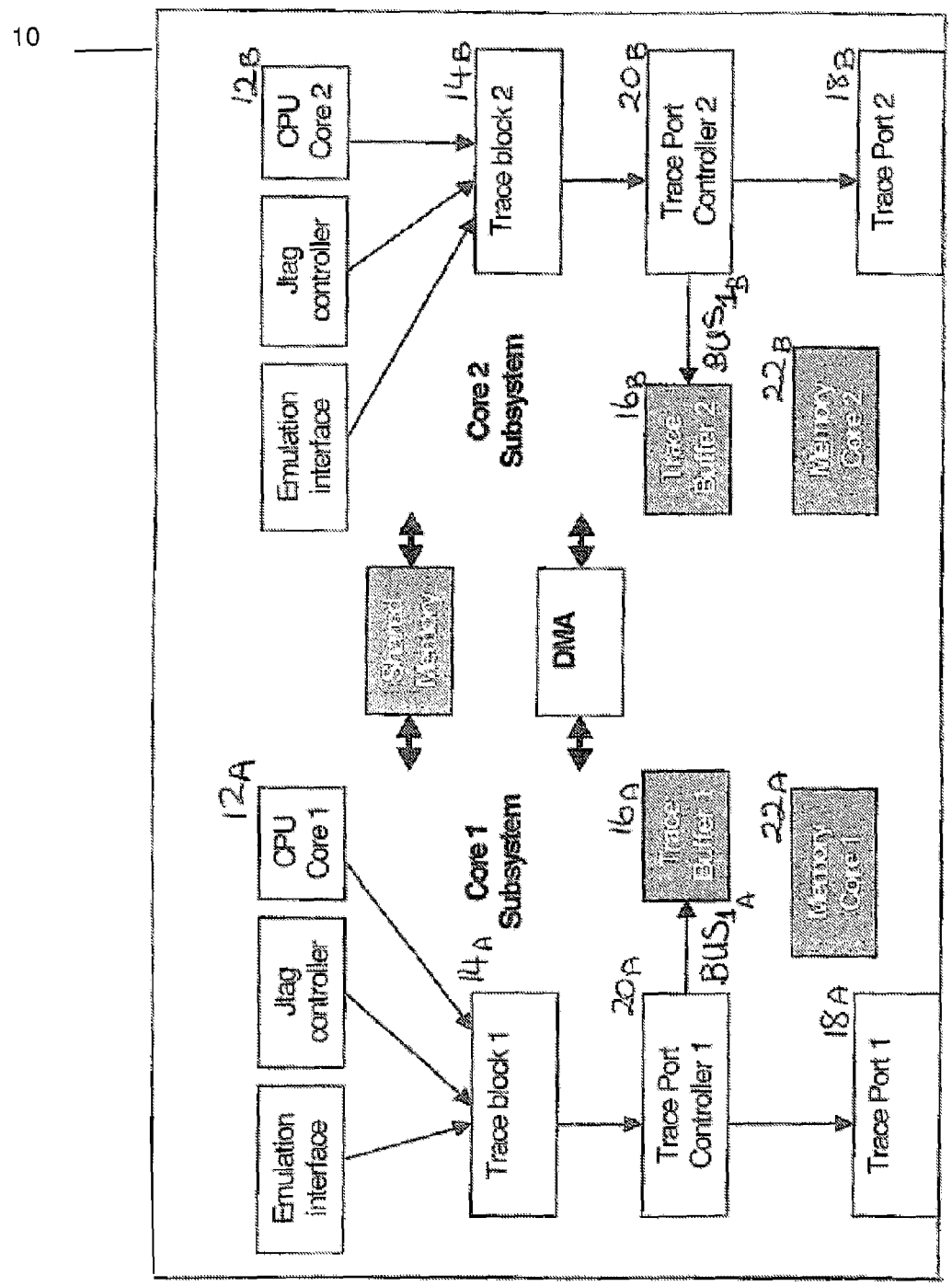
FIG. 1 is a block diagram of a conventional SoC trace system.

In a conventional SoC trace system, each core on the SoC is provided with a dedicated hardware trace module that generates trace information from the core. For instance, the SoC trace system 10 depicted in FIG. 1 comprises two cores 12a and 12b, wherein cores 12a and 12b are respectively provided with hardware trace modules 14a and 14b. Each of the cores 12a and 12b is further provided with an internal trace buffer 16a and 16b respectively (i.e. an embedded dedicated memory that may be accessed by software as scratch RAM) and/or a trace port 18a and 18b respectively. The trace ports 18a and 18b of the cores 12a and 12b respectively are connected to an external trace buffer (not shown). The trace ports 18a and 18b may be alternatively connected to external analysis hardware (e.g. a logic analyser) to enable trace data to be analysed by the analysis hardware without first passing through the external trace buffer.

If any given core 12a or 12b on the SoC is provided with both an internal trace buffer 16a or 16b and a trace port 18a or 18b, the core 12a or 12b is further provided with a trace port controller 20a or 20b respectively. The trace port controllers 20a and 20b act as data routers redirecting trace information to the internal trace buffers 16a and 16b respectively (via a dedicated bus $BUS_{1a}$ or $BUS_{1b}$ respectively) or the trace ports 18a and 18b as appropriate.

In use, trace data from the cores 12a and 12b is transmitted through their associated trace ports 18a and 18b respectively to the external trace buffer (not shown) wherein the trace data is stored for later processing. Although it should be noted that trace data may also be transmitted from trace ports 18a and 18b to external hardware (such as a logic analyser) without passing through an external trace buffer.

However, trace data may also be stored in each core's internal trace buffer 16a or 16b respectively. This is mainly used if a number of events need to be tracked over a short period of time. In particular, the rate at which data may be sampled and stored in the external trace buffer is limited by the response rate of the core's trace port 18a or 18b. However, if data is stored directly in the core's internal trace buffer 16a or 16b, the delay associated with core's trace port 18a or 18b can be avoided. A core's internal trace buffer 16a or 16b is also used if the core's trace port 18a or 18b cannot be accessed because it has been multiplexed with another functional interface (e.g. a USB).

Each core may be further provided with a virtual trace buffer, which is essentially a part of the core's own memory 22a or 22b that is reserved for the storage of trace data.

However, internal trace buffers 16a and 16b are dedicated memory components, which are not used by the software of an SoC during normal operation. Since the internal trace buffers 16a and 16b cannot be used both as memory for tracing and as a scratch memory, the inclusion of internal trace buffers 16a and 16b on an SoC effectively reduces the amount of memory that could otherwise be incorporated in the SoC for the applications running on the SoC. Furthermore, the inclusion of internal trace buffers 16a and 16b in an SoC increases the die size of the chip and hence the cost of the chip.

A virtual trace buffer 22a or 22b does not require the inclusion of an additional memory element on an SoC, since the virtual trace buffer 22a or 22b is effectively a portion of the core's own memory. However, it limits the amount of the core's memory available for programs running thereon. This is likely to be particularly problematic when tracing part of a full production software stack, which uses all the memory available.

The present invention modifies the traditional SoC trace system by removing the on-chip internal trace buffer(s) of the cores.

For the sake of simplicity, the SoC trace system in accordance with the invention will be known henceforth as a modified SoC trace system. Similarly, the following discussion of the operation of the modified SoC trace system will focus on an exemplary dual core SoC. However, it will be understood that the modified SoC trace system is not limited to SoCs comprising only two cores, but could instead be extended to SoCs comprising more than two cores.

Figure 2:
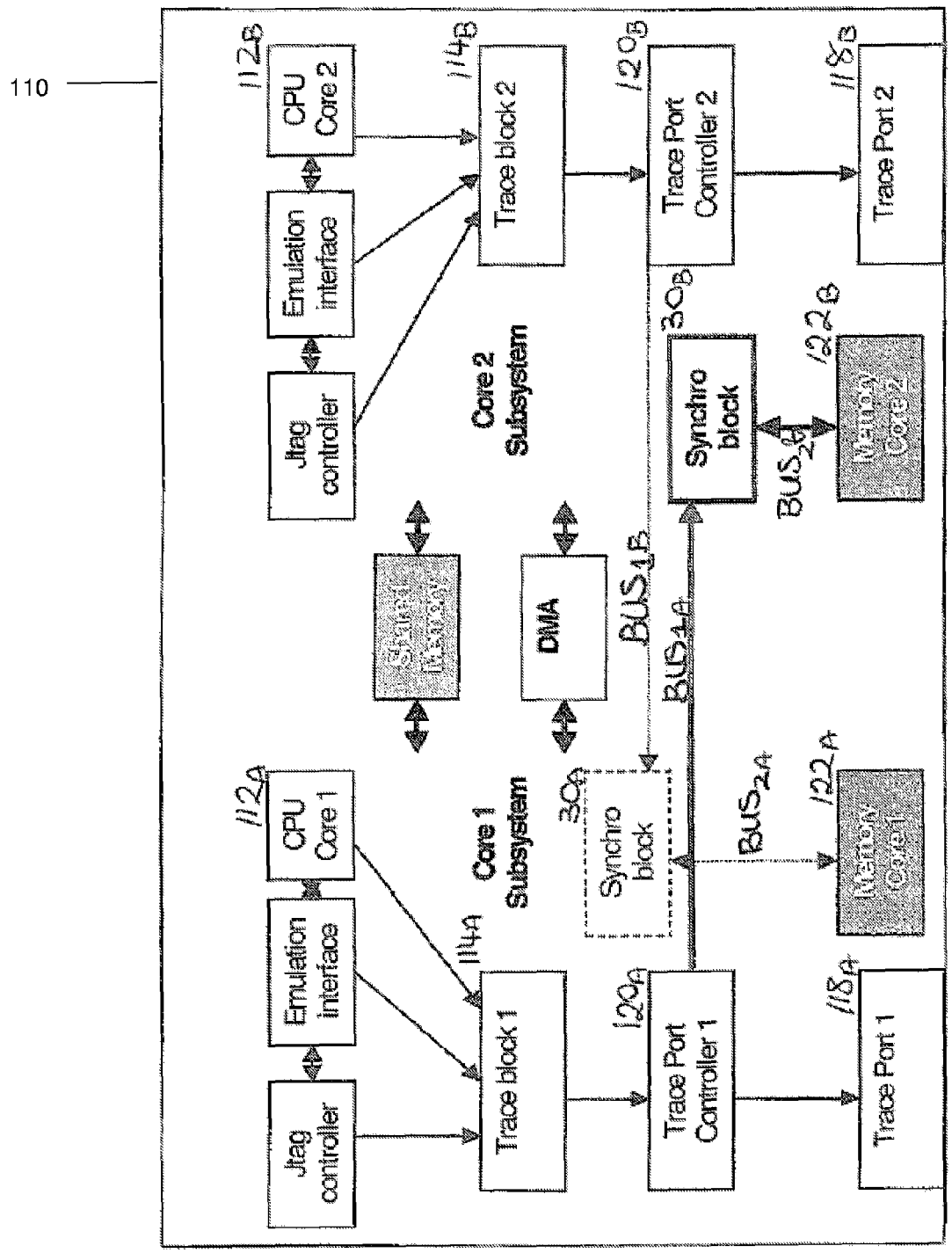
FIG. 2 is a block diagram of a SoC trace system in accordance with the invention.

Referring to FIG. 2, in common with a conventional SoC trace system, each core 112a and 112b in a modified SoC trace system 110 is provided with a dedicated hardware trace module 114a and 114b respectively that generates trace information from the core 112a or 112b. In further similarity with a conventional SoC trace system, each core 112a and 112b in a modified SoC trace system 110 is provided with a trace port 118a and 118b respectively and a trace port controller 120a and 120b respectively.

However, in contrast with a conventional SoC trace system, the cores 112a and 112b in a modified SoC trace system are not provided with an internal trace buffer. This significantly reduces the cost of the modified SoC trace system. Accordingly, the trace port controller in a modified SoC trace system redirects trace data (from a core) to either the trace port of the core or the memory of any other cores in the SoC (by means of a dedicated bus).

For simplicity, let the core whose trace data is being acquired be known as a donor core and the core in whose memory the trace data is being stored, be known as the recipient core. Then, using the modified SoC trace system depicted in FIG. 2, trace data from donor core 12a may be stored inside a memory 122b of recipient core 12b. Alternatively, trace data from donor core 12b may be stored inside a memory 122a of recipient core 12a.

Thus, in contrast with the process of storing trace data in the virtual memory of a core in some prior art SoC trace systems, the modified SoC trace system is non-intrusive on the memory of a donor core. On another note, it should be recognised that since the size of the trace buffers in the modified SoC trace system is largely dependent on the memory available to a recipient core, the trace buffers in the modified SoC trace system can be significantly larger than that of the dedicated internal trace buffers of conventional SoC systems.

Since the cores in an SoC typically operate at different speeds, the transfer of trace data from a donor core into the memory of a recipient core must be carefully synchronised with the operation of the recipient core. Nonetheless, trace blocks typically have an internal first-in first out (FIFO) register, which partially buffers the flow of trace data.

In particular, information is transmitted from a donor core's trace port controller 120a or 120b to a synchronisation block 30a or 30b respectively through a dedicated bus $BUS_{1,a}$ or $BUS_{1,b}$ respectively. The dedicated bus $BUS_{1,a}$ or $BUS_{1,b}$ is the same as the bus between the trace port controller (20a and 20b respectively) and the internal trace buffer (16a and 16b respectively) in FIG. 1.

The synchronisation block 30a or 30b is in turn connected to the memory 120a or 120b of the recipient core by another dedicated bus $BUS_{2,a}$ or $BUS_{2,b}$ respectively. This may be a shared bus if the synchronisation block 30a or 30b is connected to an arbiter (such as a cross-bar switch) to access the memory 120a or 120b.

The synchronisation block 30a or 30b synchronises the clock rates of $BUS_{1,a}$ or $BUS_{1,b}$ respectively; and $BUS_{2,a}$ or $BUS_{2,b}$ respectively. The synchronisation block 30a or 30b also acts as a bus protocol converter insofar as it converts the protocol of $BUS_{1,a}$ or $BUS_{1,b}$ respectively, into that of $BUS_{2,a}$ or $BUS_{2,b}$ respectively; for instance if $BUS_{1,a}$ or $BUS_{1,b}$ employs the Freescale IP bus protocol and $BUS_{2,a}$ or $BUS_{2,b}$ employs the advanced high-performance bus (AHB) protocol.

The tracing mechanism in the modified SoC trace system remains non-intrusive insofar as once programmed the hardware trace module 114a or 114b in each core generates trace data as normal. In particular, since the differences between the modified SoC trace system and the conventional SoC trace system are mainly confined to the relationship between the trace port controller of a donor core and the memory of a recipient core, the modified SoC trace system has substantially no impact on the trace blocks and trace ports of the donor and recipient cores.

Accordingly, the modified SoC trace system has no impact on multicore tracing to external trace buffers through the trace ports or external hardware (e.g. a logic analyzer) that bypasses the external trace buffers. Furthermore, the modified SoC trace system has limited impact on the trace port controllers of the ports. Similarly, the modified SoC trace system does not impact on static debugging and multicore debugging if trace data is not being acquired.

The down side of the modified SoC trace system is that it is adapted for single core tracing. In particular, since it is necessary to reserve some space in a recipient core's memory for receipt of data from a donor core, the architecture of the modified SoC trace system impacts on the recipient core's software. However, if the software stacks running on the cores in an SoC are highly independent, there is no need to trace all the cores simultaneously. Consequently, it is sufficient to trace each core individually. This is more and more the tendency in wireless applications, wherein a single core modem stack runs on a DSP and applications run on the MCU.

Similarly, whilst, it is possible for the trace buffers on the different cores on the modified SoC system to be used simultaneously, it is not possible to simultaneously use the trace buffer of a recipient core and the trace port of a donor core.

Furthermore, accessing the content of the trace buffer at the end of a test is more complex than with a conventional SoC trace system. In particular, trace data analysis software cannot access the memory buffer directly but must setup a direct memory access (DMA) transfer therewith.

Modifications and alterations may be made to the above without departing from the scope of the invention.

The invention claimed is:

1. A method comprising:
    transferring trace data between a first processor and a synchronizing block using a first internal bus, the trace data comprising a history of instructions executed at the first processor, the first internal bus operable with a first protocol, and wherein the trace data is synchronous to a first clock;

synchronising the trace data to a second clock to provide synchronised trace data; and transferring the synchronised trace data to a virtual trace buffer at a memory corresponding to a second processor using a second internal bus, the second internal bus operable with a second protocol, the virtual trace buffer representing a portion of a memory, the memory further operable to provide scratch storage in support of programs executing at the second processor.

2. The method of claim 1 wherein the first clock is associated with a frequency of operation at the first processor and the second clock is associated with a frequency of operation at the second processor.

3. The method of claim 2 wherein synchronising the trace data further comprises converting between the first protocol and the second protocol.

4. The method of claim 1 wherein synchronising the trace data further comprises converting between the first protocol and the second protocol.

5. The method of claim 1 further comprising accessing trace information stored at the memory using a direct memory access protocol.

6. The method of claim 1 wherein the first processor and the memory are included at a single integrated circuit and further comprising providing the trace data to a device external to the integrated circuit via a trace port.

7. A system comprising:

a trace block included at a first processor, the trace block operable to provide trace data to a first internal bus, the trace data comprising a history of instructions executed at the first processor, the first internal bus operable with a first protocol, and wherein the trace data is synchronous to a first clock;

a synchronising block coupled to the first internal bus, the synchronising module operable to receive the trace data and provide synchronised trace data, the synchronised trace data synchronous to a second clock, and to provide the synchronised trace data to a second internal bus; and a memory included at a second processor and coupled to the second internal bus operable with a second protocol, the memory operable to store the synchronised trace data at a virtual trace buffer, the virtual trace buffer representing a portion of the memory, the memory further operable to provide scratch storage in support of programs executing at the second processor.

8. The system according to claim 7 wherein the first processor and the second processor and the memory are provided at a single integrated circuit.

9. The system of claim 8 further comprising a trace port, the trace port coupled to the trace block and operable to provide the trace data to a device external to the integrated circuit.

10. The system according to claim 7 wherein the second internal bus is a dedicated internal bus.

11. The system according to claim 10 wherein the synchronising block is configured to convert between the first protocol and the second protocols.

12. The system according to claim 11 wherein the synchronised trace data is synchronous with a frequency of the second processor.

13. The system according to claim 7 wherein the second internal bus is a shared internal bus and the system further comprises an arbiter connected between the synchronising block and the second internal bus.

14. The system according to claim 13 wherein the arbiter is a crossbar switch.

15. The system according to claim 14 wherein a frequency of operation of the second processor is based on the second clock.

16. The system according to claim 13 wherein a frequency of operation of the second processor is based on the second clock.

17. The system according to claim 13 wherein the synchronising block is adaptable to convert between the first and second protocols.

18. The system according to claim 7 wherein the second internal bus is a dedicated internal bus.

19. The system according to claim 7 wherein: the second internal bus is a shared internal bus and wherein transferring the synchronised trace data further comprises transferring the synchronised trace data to the second internal bus via an arbiter.

20. The system of claim 7 further comprising a direct memory access (DMA) block, the DMA block operable to access trace information stored at the memory.

* * * * *